No. 794,816. PATENTED JULY 18, 1905.
F. A. SEIBERLING.
VEHICLE TIRE.
APPLICATION FILED MAR. 15, 1905.
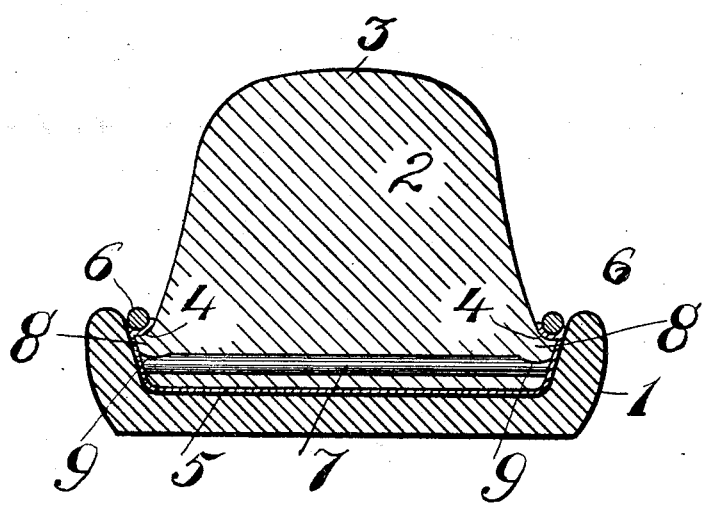

No. 794,816. Patented July 18, 1905.

UNITED STATES PATENT OFFICE.

FRANK A. SEIBERLING, OF AKRON, OHIO.

VEHICLE-TIRE.

SPECIFICATION forming part of Letters Patent No. 794,816, dated July 18, 1905.

Application filed March 15, 1905. Serial No. 250,243.

*To all whom it may concern:*

Be it known that I, FRANK A. SEIBERLING, a citizen of the United States, residing at Akron, in the county of Summit and State of Ohio, have invented new and useful Improvements in Vehicle-Tires, of which the following is a specification.

This invention relates generally to improvements in solid elastic vehicle-tires and the means used for retaining them in position on a vehicle-wheel, and has especial relation to that type of tires known as "side-wire tires," which comprise one or more circumferential retaining-bands arranged at one or both of the sides of the tire to secure it from displacement.

In providing the tire herein described it is sought to retain all the resilient and wearing qualities of the tires heretofore offered, as well as their well-known adaptability for general use, and to eliminate, as far as possible, all defects and weaknesses, both in structure and assemblage, which they may have.

As now commonly constructed, side-wire tires are provided along their sides with circumferential tire-retaining-wire seats, which usually bear against the inner sides of the channeled rim in which the tire seats, and into these seats are sprung rings or bands of wire by working them over the side flanges of the rim, as contradistinguished from forming the tire-retaining bands from a straight-length piece of wire in the seats in the tire in the first instance and following this by brazing the ends together. In addition to these circumferential retaining-wires it is customary to insert in the base portion of the body of the tire at intervals throughout its entire circumference a series of transverse wires or bars so positioned that their outer ends are exposed in the seats formed along the sides of the tire-body sufficiently to permit the side or circumferential wires to engage them and rest thereon, and it naturally follows that as these transverse wires collectively have a large amount of bearing-surface in the tire-body and are therefore relatively unyieldingly retained in place they offer a serious obstacle to the placing in position of a circumferential wire band, which, being annularly formed, must necessarily rest a large portion of its inner circumference on the ends of the transverse wires while the balance or remaining portion thereof is being sprung over the side of the rim-flange. These unyielding qualities of the transverse wires when so positioned require the making of the diameter of the circle formed by the circumferential bands larger than would be otherwise necessary for the reason just given, and hence when in position they do not exert such an effectual retaining result upon the tire as might otherwise be obtained.

This invention further aims to eliminate another objection to the seating of the circumferential bands on the ends of the transverse wires, which is the grinding or wearing away of the ends of the transverse wires due to constant friction between the bands and the wires occasioned by the resilient qualities of the material comprising the tire in which the transverse wires are embedded and its well-known characteristic of moving and creeping when under intermittent compression. The effect of this grinding away of the ends of the transverse wires is to cause them to become rounded and shortened to such an extent as to allow them to become easily freed from engagement with the circumferential wires, and thus permit their springing out of place under the influence of the pressure of the circumferential wire on their opposite ends and the consequent freeing of the tire from the rim.

This invention consists, broadly speaking, in peculiarly constructing the transverse wires for the purpose to which they are to be put and in so placing them in the material of the tire-body that there will exist between the circumferential bands and the transverse wires a sufficient quantity of material to effectually prevent the wearing thereof and also offer an auxiliary cushioning effect.

With the foregoing and other objects in view the invention consists in the novel construction, combination, and arrangement of parts constituting the tire, to be hereinafter referred to, and illustrated in the accompanying drawing, which forms a part of this specification, and in which is shown the preferred embodiment of the invention; but it is to be understood that changes, variations, and modifications can be resorted to which come within the scope of the claim hereunto appended.

In the drawing, which illustrates a cross-section of a vehicle-wheel rim, with the tire in position, reference character 1 denotes the metallic channeled rim. Within the channel 1 is placed a tire-body of suitable material, such as vulcanized rubber 2, the tread portion 3 of which may be of any preferred conformation which suits the fancy or desires of the trade. The base portion thereof is formed to substantially fit the interior of the metallic channel 1. Along the sides of the tire-body 2 are formed tire-retaining-wire seats 4, approximately as shown in the drawing, which represents the sides of the tire as being abruptly outwardly turned to meet the outwardly-flaring sides of the base portion of the tire. The seats may and preferably in the smaller sizes of tires will take the form of semicircular grooves; but their use and function will be the same as the seats illustrated in the accompanying drawing.

The seats 4, as well as the sides and base of the tire, are preferably covered with one or more layers of fabric 5, attached usually to the tire-body during the vulcanization thereof.

Upon the seats 4 of the tire-body 2 are placed two annularly-formed bands 6, the cross-sectional configuration of which is immaterial to this invention; but they are preferably made round, as shown in the drawing, and the tension upon these bands 6 is such as will firmly retain the tire 2 fixedly in its seat in the rim 1.

At intervals throughout the entire base portion of the tire there are embedded short transverse wires or bars 7, and they will be so placed in the tire-body that there will preferably exist between their outer ends and the bands 6 a portion 8 of the material of the tire-body. If desired, however, the space existing immediately below the tire-retaining-wire seats 4 may be built up or stiffened with fabric vulcanized into union with the tire-body. In order to place these transverse wires 7 high enough from the base of the tire to permit the existence thereunder of a portion of the material of the tire-body and yet permit as large a space to exist between the outer ends of these transverse wires and the band 6 as possible, I prefer to indent, usually on curvilinear lines, the outer ends of the transverse wires with shallow depressions 9, as shown in the drawing, thereby allowing, as has just been mentioned, a uniformly greater thickness of material between the bands 6 and the wires 7.

It will be stated that instead of forming the base portion of the tire below the transverse wires 7 wholly from vulcanized rubber a layer or layers of fabric may be incorporated therein to assist in preventing the wires 7 from cutting or tearing the tire-body; but as the incorporation into or coating of vulcanized rubber articles with fabric is a well-known expedient in the art as a means for preventing wear and otherwise protecting rubber it is not deemed necessary to illustrate its application herein.

The assembling of a wheel using a tire such as is herein described will in no wise differ from the customary practice previously described for seating the ordinary side-wire tires, and the body of material which exists between the bands 6 and the transverse wires 7 will enable a band of smaller diameter to be employed, thereby obtaining greater and more effectual retaining results at the point where it is most needed in the securing of the tires upon the wheel-rims, and enables the work to be accomplished with less effort on the part of the manipulator. It will be obvious, also, from the foregoing description that the existence of the body of material 8, between the bands 6 and transverse wires 7, will serve effectually to prevent the wearing or grinding away of the ends of the transverse wires 7, the advantages of which have been hereinbefore mentioned. The seating of the circumferential bands 6 entirely upon a body of material other than metallic throughout the entire circumference of the tire offers to the bands 6 a peculiar effect, due to the inherent properties of the interposed material, which serves to constantly keep the bands upon a much better tension than they would be were they seated substantially entirely upon the metallic wires.

Having thus described my invention, what I claim, and desire to secure by Letters Patent, is—

A tire of the class designated arranged to seat in a channeled vehicle-wheel rim and provided along one of its sides with an integral seat, a circumferential band to rest on said seat, and a series of transverse wires or bars embedded in the base portion of said tire and separated from said circumferential band by the tire-body, said wires or bars being provided near their ends with indentations.

In testimony whereof I have hereunto set my hand in presence of two subscribing witnesses.

FRANK A. SEIBERLING.

Witnesses:
   C. E. HUMPHREY,
   GLENARA FOX.